Figure 1:
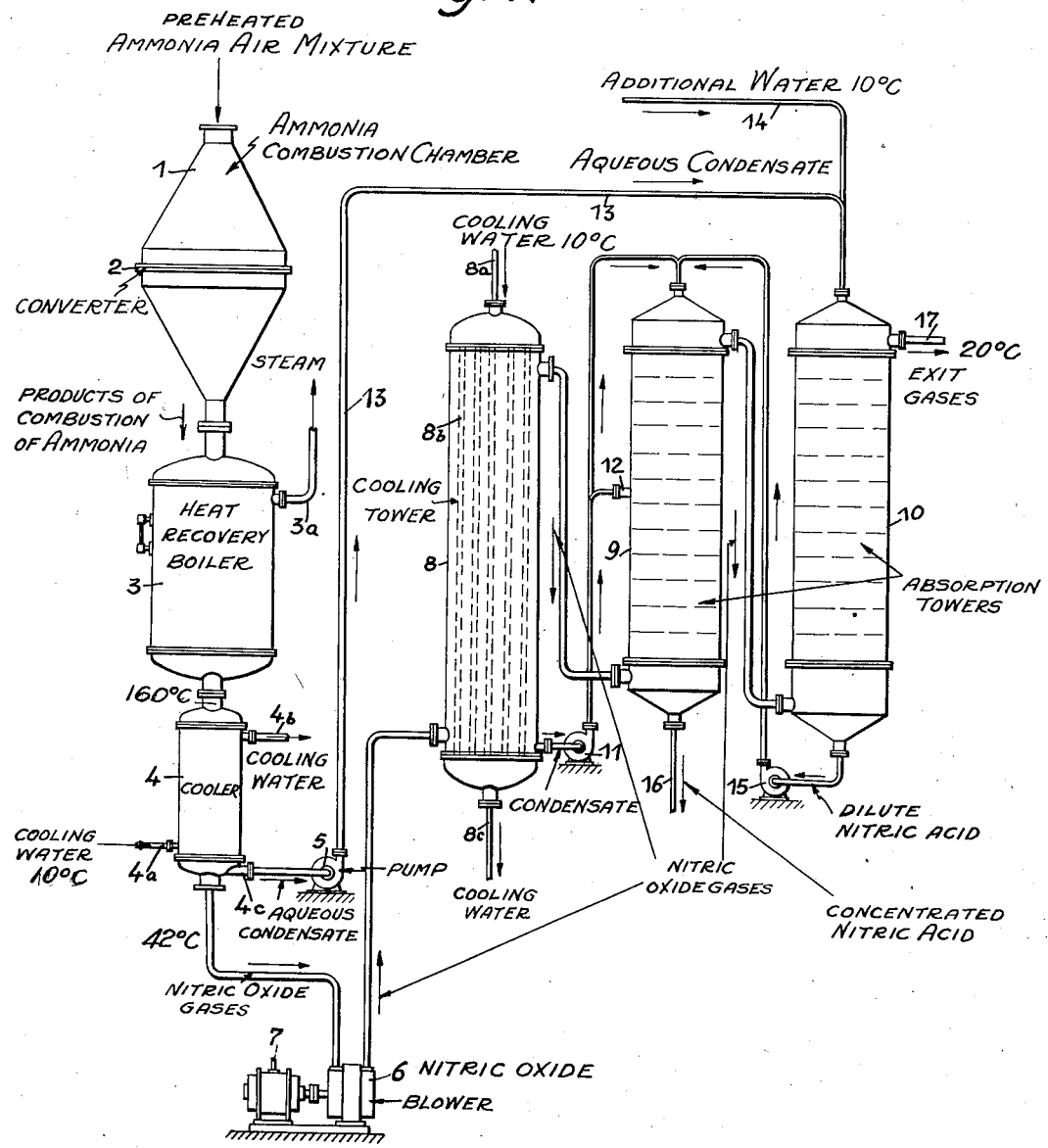

Oct. 22, 1935.  N. CARO ET AL  2,018,249
PROCESS OF CARRYING THROUGH GAS REACTIONS
Filed July 5, 1929  2 Sheets-Sheet 1

Inventors
NIKODEM CARO
ALBERT R. FRANK
RUDOLF WENDLANDT
THOMAS FISCHER
BY Richards & Geier
ATTORNEYS Patented Oct. 22, 1935

2,018,249

UNITED STATES PATENT OFFICE 2,018,249

PROCESS OF CARRYING THROUGH GAS REACTIONS

Nikodem Caro and Albert Rudolf Frank, Berlin, and Rudolf Wendlandt and Thomas Fischer, Piesteritz, near Wittenberg, Germany Application July 5, 1929, Serial No. 376,267
In Germany November 24, 1927

13 Claims. (Cl. 23—162)

The present invention relates to reactions between gases and particularly to those reactions involving the utilization of a catalyst which must be controlled so as to take place within narrow pressure and temperature limits and also to the recovery of the reaction products from the reaction gases.

In carrying out catalytic gas reactions, in which the reaction must be controlled within narrow temperature and pressure limits, conventional methods cannot be employed to control the temperature and pressure.

It has been found, particularly in the case of highly exothermic reactions which are sensitive to temperature, that the heat of the reaction may be regulated by diluting the reaction gases with an inert gas or gases. However, when it is desired to recover the valuable reaction products from the final reaction mixture, the presence of large quantities of such inert gas or gases render such recovery difficult and cause an overload of, or necessitate the utilization of absorbers, towers, condensers, and so forth, employed in the recovery process.

Among the objects of the present invention are to provide a method of carrying out gas reactions in which gases may be added to the reaction mixture in such a way as to enable satisfactory control of the temperature and pressure in the catalytic zone, without particularly rendering the recovery of the valuable reaction products from the final reaction mixture more difficult, and without greatly or undesirably increasing the load on the absorbers, towers, condensers, and the like, or necessitating the utilization of excessive capacity in such recovery apparatus.

In one embodiment of the present invention such additions are made to the reaction mixture for controlling the temperature, pressure, and so forth, as will per se be readily removed, or as will be converted into products which may be easily separated, from the desired reaction products, preferably before the recovery of such reaction products or which in themselves may give rise to valuable products in the catalytic zone, which last mentioned products may be recovered together with or separately from the primary reaction products desired.

For example, steam or carbon dioxide may be added to the incoming reaction gases, both of these gases being easily condensed, absorbed, or otherwise separated from the reaction gases, as in the form of an aqueous solution, after they have passed through the reaction zone. Instead of using steam or carbon dioxide per se, hydrogen and carbon monoxide may be utilized in oxidation reactions with resultant formation of water vapor or carbon dioxide, the additional advantage being had in such case that the combustion of the hydrogen or carbon monoxide in the catalytic zone will generate heat and in this manner assist reactions where the addition of heat is desirable.

In some cases sulphur dioxide may also be utilized and the sulphur trioxide or sulphuric acid formed may be removed after the reaction zone, the heat of combustion of the sulphur dioxide to the sulphur trioxide in this case also advantageously affecting the catalytic reaction.

In a preferred embodiment of the present invention, water vapor in the form of steam may be added to the reaction gases entering a catalytic ammonia oxidation process. The combustion gas mixture leaving a combustion chamber or converter consists usually mainly of nitrogen, oxygen, water vapor and nitric oxide (NO); the object of the whole process is the production of concentrated nitrogen oxides, particularly nitrogen peroxide ($NO_2$), and concentrated nitric acid, by the oxidation of the nitric oxide (NO) and the condensation or absorption of the oxidized gases. Preferably to prevent the formation of diluted nitric acid, this water is removed from the reaction mixture after passage through the reaction zone before the recovery of the nitrogen oxides or nitric acid.

If besides the addition of water vapor in the form of steam, sulphur dioxide is also added to the reaction gases, sulphuric acid may be conveniently separated from the reaction mixture before the separation of the nitrogen oxides or nitric acid, the process being subject to such control so that the sulphuric acid may be obtained in any desired concentration aqueous, concentrated, or fuming, and in one instance in a concentration of about 60% strength.

In preliminarily separating various constituents of the gaseous reaction products of the present invention, and particularly water vapor therefrom, prior to separation of the primary reaction products, it is not desirable to cool the gases below the condensation or dewpoint temperature of the mixture, since mist, fog and/or fume formation will occur, which renders particularly difficult effective separation of the gases from the condensed constituents, and the condensed constituents from each other. When such a fume, fog or mist is formed, the gas mixture must be further cooled to such a degree that a mixture of all the condensable constituents will be deposited from it.

A further object of the present invention therefore is to provide a gas separation process in which it is possible to separate preliminarily various constituents from gas reaction mixtures, and particularly to separate water vapor from gas mixtures in which it may be contained, without obtaining fogs or mists, from which the desired products may only be recovered with difficulty, all without the necessity of excessive cooling, or any undesirable degree of cooling of the entire body of the reaction gases.

In carrying out this object, it is not possible to use rectification and dephlegmation columns or refrigerating installations according to standard operating methods, since in the case of these cooling and condensing methods it is necessary to regulate the discharge temperature of the gas to below the condensation temperature or dewpoint temperature to secure effective separation. As a result all condensible constituents will be contained in the condensate and no preliminary separation can be obtained.

In the preferred embodiment of the present invention, this preliminary separation is therefore performed by placing cold surfaces in the stream of the reaction gas as it flows from the catalytic zone, and in some instances after it has flown through a heat recovery apparatus such as a boiler, under such conditions that the surfaces will become coated with and will collect the desired material which is to be condensed. The temperature of the cooling surface should be such, that the partial pressure of the constituent to be preliminarily separated or condensed will be caused to decrease rapidly in the direction of the cooling surface, with the result that such constituent is condensed, and/or precipitated in solid or liquid form upon the cooling surface.

After the gas mixture has passed in contact with a suitable area of cooling surface of this character, the constituent to be preliminarily separated will be removed substantially completely, or partially to a desired extent, from the reaction mixture containing the principally desired product.

Although in its preferred application, the present invention contemplates the removal of water vapor from gaseous reaction mixtures, such as will result from catalytic oxidation of ammonia, the application of the invention may be conveniently illustrated by giving a specific example as to its employment in the separation of moisture from air.

As a specific example, at atmospheric pressure, it is desired to remove ¾ of the water vapor from air containing 11.2% by volume thereof and having a dewpoint or condensation temperature of 48° C.

In achieving this reduction in water vapor and its partial condensation a wide variety of shapes and forms of cool surfaces may be employed for contact with the gas, and by way of example, aluminum pipes of 10 millimeters in diameter and of one meter in length may be employed. These pipes are cooled to a desired temperature with water of about 2° C., which water should preferably flow in contact with such pipes in countercurrent direction to the flow of gas.

Such a condenser when the condensate flows concurrently with the gas, with a partial pressure drop of 0.2 atmosphere or more, will remove from the gas 8 liters of liquid water per hour per square meter of cooling surface. The gas mixture flowing out of the condensing apparatus will have a temperature of 80° C. and with a dewpoint or condensation temperature of 22.5° C. Under these circumstances a ¾ reduction of the moisture will be obtained.

When the gas or air to be treated contains a higher percentage of water vapor, wider or conical pipes, or other sizes of pipe lengths, or cooling tubes may be employed. With a lower percentage of water vapor, it is desirable that the cooling walls or surfaces be maintained at a lower temperature. The condensate or the cooling water may flow in the same direction as, or countercurrent to, the flow of the gas, or it may flow transversely to the same. In some instances the cooling surface may consist in part or whole of the cold condensate itself or of the cooling liquid.

This condensation method is particularly advantageous inasmuch as it is possible to utilize much less cooling surface for the same amount of condensate, and also because much less heat has to be removed from the gas mixture being treated, less refrigeration or cooling capacity is necessary.

Although the condensation method just described has a preferred application to the removal of water vapor and similar condensible constituents from air and reaction gas mixtures, it may also be applied for removing and recovering volatile constituents and solvent vapors from waste gases, and it is also broadly applicable to rectification and fractionation processes.

The condensation process of the present invention has special application where it is desired to remove a condensible constituent from gas mixtures without at the same time causing chemical reaction to take place, or to displace the chemical equilibrium of the gas mixtures by a substantial change in the temperature thereof. The reaction mixture containing nitrogen oxides and water vapor resulting from the catalytic oxidation of ammonia is an example of such a mixture.

In carrying out the preferred separation as above described, it is desirable to remove the condensate from the cooling surface as soon as possible, so as to prevent any possible further reaction between the condensate and the gas mixture, and also to exclude any possibility of reevaporation. This is most conveniently done by deflecting the gas flow in whole or part as for example through an angle of 90 to 180 degrees; by imparting to the gas a rotating movement; or by utilizing telescoped tubes or piping, which may have conical ends, and are substantially of different diameters, and so arranged that the gas will flow from the wider pipe into the narrower pipe, whereas the condensate will flow along the wall of the wider pipe and will not enter into the narrower pipe. In another arrangement the condensate may be caused to flow transversely to the gas flow, the condensing surfaces being provided with ribs for conducting away the condensate. The separation of the condensate may also be desirably effected by mechanical means.

As an example of the specific application of the present invention, a mixture of nitrogen oxides consisting principally of nitric oxide (NO) and having a temperature of 200° C. resulting from the catalytic oxidation of ammonia, which may have been passed through a heat recovery apparatus or boiler, is passed into a suitable condenser arrangement. With only five square meters of cooling surface per ton of ammonia burnt per day, ¾ of the water vapor may be separated or condensed from the nitric oxide which is present in the amount of about 9% by volume with substantially very little absorption of the nitric oxide (NO), absorption of the oxidized nitric oxide, or solution of the nitric oxide itself in said condensate, if any.

The resultant gas containing the nitric oxide may then be passed into the nitric acid recovery plant. By preliminarily separating water vapor in this manner considerable economy may be had in such recovery plant. In one case it was possible to reduce the acid proof cooling surface from ½ to ⅔. With nitric acid recovery apparatus of the same capacity an acid of much higher concentration may be obtained and, if desired, the alkaline absorption apparatus used may be omitted or reduced in capacity.

In one instance where an apparatus for the oxidation of ammonia and a condensing separator were arranged in series, and directly connected to each other, with only five square meters of cooling surface per ton of ammonia, one-half of the water vapor of the reaction gases is removed, even in a case where the reaction mixture contains as much as 30% by volume of oxygen. In carrying out this condensation it was only necessary to reduce the temperature of the gaseous mixture to 70 to 80° C.

To contrast this process with an ordinary separation process, where the gases were cooled below the dewpoint or condensation temperature, at least 3 times as much cooling surface is required. Moreover, a condensate consisting of dilute nitric acid is produced which will not serve either as production acid for commercial sale, nor can it be used as an absorption agent for the oxidized nitrogen oxides, as may the aqueous condensate produced according to the present invention, which aqueous condensate is substantially free of nitrogen oxide.

In working with reaction mixtures rich in oxygen it is possible to effect a substantial increase in the obtainable acid concentration by the method of the present invention, this being particularly true in all instances where water vapor is formed in the reaction mixture and/or is added to the reaction gases. For example, with a reaction mixture containing ammonia and an air mixture containing 60% by volume of oxygen produced by the fractional distillation of liquid air, as according to our Patent No. 1,850,129, an acid of 40° Bé. may be obtained with a total yield of about 95%.

If pure oxygen is used, gaseous or liquid nitrogen tetroxide, or a mixture of nitrogen peroxide and aqueous nitric acid may be prepared, which may be readily processed to form a highly concentrated nitric acid, all without a complicated arrangement of towers, pumps, elevating conduits, ventilators, and other elements now constituting conventional condensation apparatus commonly in use.

To give one specific example, a reaction mixture of 1 volume of ammonia with 1.5 to 2.5 volumes of undiluted oxygen is passed through a catalytic oxidation apparatus, as disclosed in our Patent No. 1,850,129. It is possible to separate a greater portion of the water formed in the reaction mixture, or added to the gas before introduction to the catalytic zone, even though the exit gases have a temperature above 100° C. for example varying from 110 to 190° C. It will be noted in this example the temperature of the effluent gas mixture is above the boiling point of the separated or condensed constituent, a result which can only be obtained from highly concentrated mixtures of nitric oxide and oxygen.

The method of the present invention may also be readily applied to the separation of water, ammonium salts, and hydrocyanic acid from ammoniacal gas mixtures, as are obtained in the hydrocyanic acid synthesis from ammonia and carbon monoxide, and in processes involving the production of cyanamide. By so removing the reaction products from the gas mixtures, the residual unreacted gases may be returned to the reaction for retreatment.

It will be noted according to the present invention that a gas or gaseous mixture containing a vaporized liquid constituent, particularly water, in amount much less than that required for saturation, may be treated to still further reduce the degree of saturation without decreasing the temperature to the point of saturation, and that this is done in the preferred embodiment of the present invention by passing the partly saturated gases over surfaces which have been cooled to a temperature far below the saturation temperature, or dewpoint, at which normally condensation commences to be effective.

The following examples will more clearly illustrate the exact differences between the present application and processes previously employed:

*Example 1.*—A hot mixture of air containing moisture vapor is passed through a cooling apparatus according to the present invention to remove three-quarters of its moisture or water content. The air mixture, when it passes into the cooling apparatus, has a dew point or saturation temperature of 48° C., and when it leaves the cooling apparatus it has a temperature substantially above its saturation point or dew point, namely about 80° C.

The dew point at this time or saturation temperature is 22.5° C. In the cooling apparatus the partial pressure drop in the gas body as it enters the cooling apparatus is 0.2 atmosphere per centimeter as measured from the gas stream toward the cooling surface and this partial pressure drop will be lowered as the gas flows through the cooling apparatus as more and more of the water vapor content is removed.

The cooling apparatus includes aluminum tubes about 10 millimeters in diameter and about 1 meter in length and the air current is caused to pass through these tubes. On the outside of the tubes is passed cooling water in counter current to the flow of the gases said cooling water having a temperature of about 2° C.

The condensate is causd to flow on the cooling surface in the same direction as the stream of gas and 8 liters of water per hour are removed as condensate per square meter of cooling surface.

It will be noted that the incoming temperature of 500° C. and the outgoing temperature of 80° C. are always substantially above the dew point or saturation temperatures, which are respectively 48° C. and 22½° C.

*Example 2.*—An ammonia combustion mixture containing about 9% by volume of nitric oxide and 14% by volume of water vapor and having a temperature of about 160° C. is passed into a cooling apparatus under a pressure of 1 atmosphere. The temperature of the leaving gas is regulated to about 42° C. With a cooler having 5 square meters of cooling surface per ton of ammonia burned per day, about three-quarters of the water formed in the reaction was removed, containing very little nitric acid. This removed water might be used for the absorption of the nitrogen oxides in the recovery thereof. The hot gases in the cooling apparatus pass through tubes of acid-proof steel of about 10 millimeters in diameter.

These tubes are cooled by water of about 10° C. flowing in counter-current to the direction of the flow of the gases.

The gases leaving the cooling apparatus had a saturation temperature of about 29° C. so that they contain about half as much water as would correspond to their content at a saturation temperature of 42° C., which was their temperature at the exit.

*Example 3.*—A gas mixture containing 30 to 35% by volume of ammonia and the residue oxygen is passed in contact with a catalyst consisting of platinum or platinum alloys under such conditions as to cause oxidation of the ammonia to nitric oxide. Steam or water may be added to the gas mixture before it is subjected to the catalysis. After the catalysis, the reaction gas mixture is contacted with tubes through which cold water is flowing, said tubes being of acid-proof steel and being for example of 8 to 12 millimeters in diameter. The cooling water may have a temperature of 30° to 8° C. and the amount of it may be so regulated that the temperature rise of the cooling water will be about 30° C. in passing through the apparatus. The gases, after catalysis, and before they are cooled, may have a temperature of 200° C. and after leaving the cooling apparatus they may have a temperature of 140° C. With a gas outlet temperature of 140° C. and a saturation or condensation temperature of 70° C., these outlet gases from the cooling apparatus will contain one-tenth as much moisture as will correspond to their saturation temperature at 140° C.

The accompanying drawings illustrate in diagrammatic fashion the processes of the present invention, as previously described.

In Figure 1 a preheated ammonia-air mixture is introduced into the ammonia combustion chamber 1 and passes through the catalyst 2, which may consist of platinum-rhodium screens. From the chamber 1 the gas mixture flows into the heat recovery boiler 3 in which the steam produced is drawn off at 3a. Instead of the heat recovery boiler 3 a preheater for the atmospheric air mixed with the ammonia may be employed. The gas mixture leaving the boiler 3 consists of the products of combustion of ammonia and contains about 9% by volume of nitric oxide.

This mixture flows into a metal cooler 4 which contains a plurality of tubes which are connected in series. The tubes which are cooled from the outside by cold water, are made of acid-proof steel and have an internal diameter of about 10 mm. The purpose of the cooler is to cause the separation of water as a condensate.

The element 1, the boiler 3 and the cooler 4 are preferably arranged in series and directly connected to each other, as shown. In the apparatus shown the working pressure may be 1 atmosphere. The normal cooling water used enters the cooler at 4a at a temperature of 10° C. and may leave the cooler at 4b. The gases entering the cooler 4 may have a temperature of 160° C. The temperature of the gas mixture which leaves the cooler may be maintained at 42° C. Under these circumstances with only five square meters of cooling surface per ton of oxidized ammonia ¾ of the water resulting from the reaction may be condensed.

This condensed water contains so little nitric acid that it may be directly fed to the device in which the nitrogen oxides are finally absorbed. As shown, the aqueous condensate is drawn off at 4c and forced by the pump 5 through the tube 13 to the absorption towers 9 and 10 in which the final absorption takes place.

The effluent nitric oxide from the cooler then flows through the cooling and oxidizing tower 8 to the absorption towers 9 and 10. The flow of the gases is caused or assisted by a blower 6 which is driven by a motor 7. The cooling water enters the vessel 8 at 8a, flows through the cooling tubes 8b and leaves the vessel at 8c.

The absorption plant is shown as equipped with two absorption towers 9 and 10 in which plates are arranged in superimposed relationship. Each plate carries a layer of liquid through which the ascending gas current passes in finely divided state. The towers 9 and 10 may be cooled from the outside by cooling coils (not shown) which are arranged above the said plates and through which the cooling water is flowing. The liquid flows downward from one sieve plate to the next.

The gas mixture leaving the cooling tower 8 enters the bottom of the tower 9 and flows upwardly therethrough. From the top of the tower 9 the gas mixture is conducted to the bottom of the tower 10 and also flows upwardly therethrough. The condensate formed in the cooler 8 is supplied to an absorption plate in the absorption tower the concentration of the acid on which is about the same as the acid concentration of the condensate. For example it may be supplied either to the top of the tower 9 or to the plate at the level indicated at 12 (which may be at any desired height in the tower 9).

The aqueous condensate separated in the cooler 4 is introduced into the upper end of the tower 10.

If required, additional water may be supplied at 14. The liquid flows from the top of the tower 10 to the bottom of the same, counter current to the flow of the nitrogen oxide mixture and is thereby continuously enriched with nitric acid. From the bottom of the tower 10 the fluid is forced into the top of the tower 9 by a pump 15. The concentrated acid obtained may be drawn off at 16. The end gases escape from the tower 10 at 17.

The mixture obtained by the combustion of ammonia, as stated above, contains about 9% by volume of NO. The mixture also contains about 14% by volume of steam, or water vapor, and oxygen and nitrogen.

Since ¾ of the water formed in the reaction is condensed in the cooler 4 about 4.1% by volume of water vapor will remain in the gas mixture. The gas mixture leaving the cooler 4 will have a dew point or saturation of about 29° C., but the actual temperature of the gases will be about 42° C. At a pressure of 1 atmosphere this last-mentioned temperature would correspond to a water vapor content of the gas of 8.4% by volume.

The gas mixture leaving the cooler 4 therefore only contains half of the amount of water vapor which it would contain if its exit temperature were its saturation temperature.

The oxidation of NO to $NO_2$ takes place in the cooling tower 8.

Figure 2:
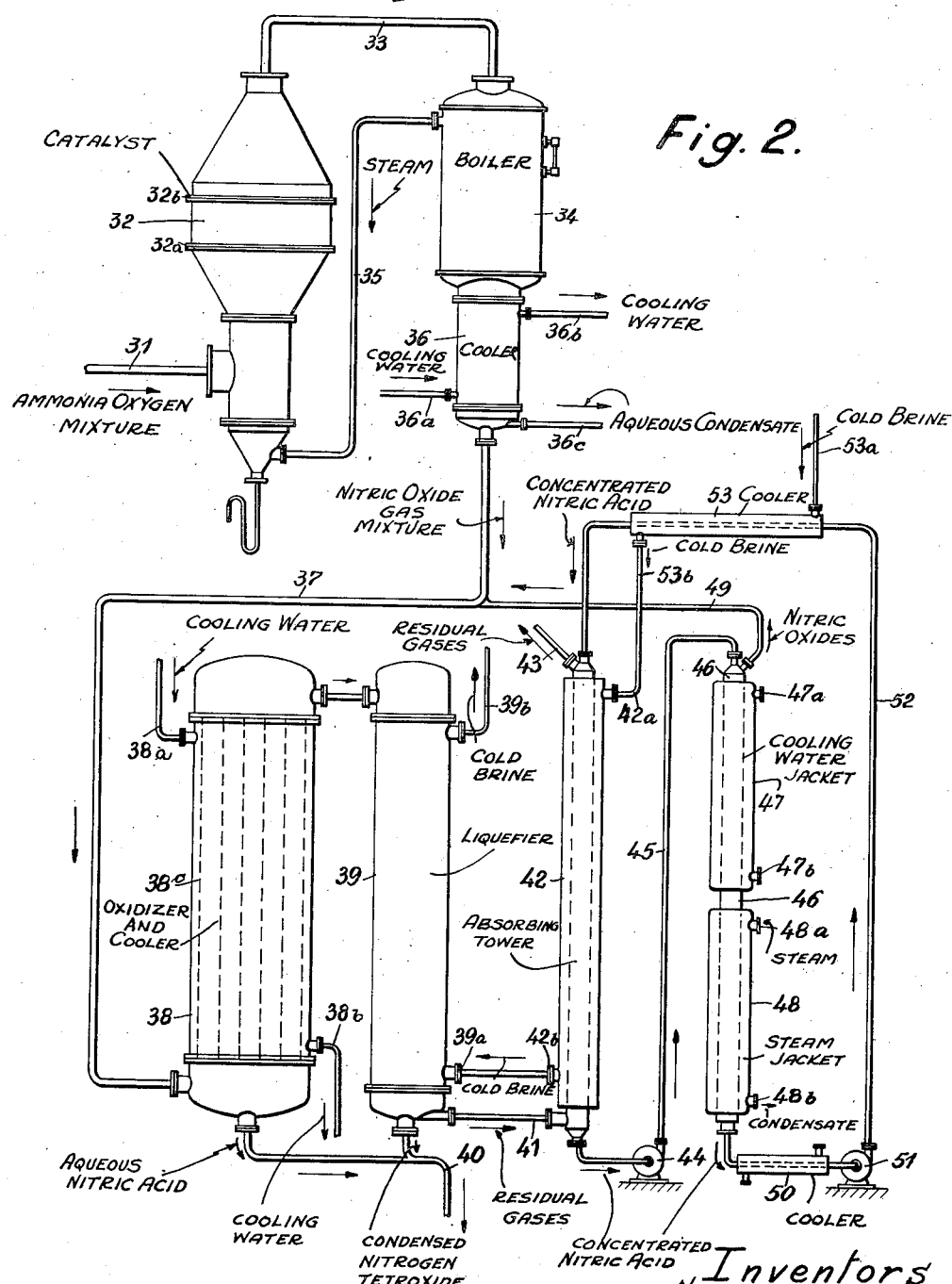

In Figure 2 a mixture consisting of 1 part by volume of $NH_3$ and 1 to 4 parts by volume of oxygen (which may be produced in any desired manner, as for example by electrolysis, by liquefying of air or the like) are passed at 31 into an ammonia combustion chamber 32. The gas mixture passes through a perforated plate 32a which is covered by a layer of water as disclosed in U. S. Patent 1,850,129 and then through a platinum-rhodium catalyst at 32b. The combustion mixture flows through the conduit 33 into the steam boiler 34. The steam produced flows through the pipe 35 back into the ammonia combustion chamber 32 in which the steam is mixed with the gas mixture entering at 31.

From the boiler 34 the gas mixture flows into a cooler 36 consisting of rolled in tubes of acid-proof steel which may have an internal diameter of about 8 or 10 mm. The tubes are connected in parallel and are cooled by water flowing around them. In the cooler the condensate is separated from the gases. The cooling water enters at 36a and leaves at 36b. The aqueous condensate contains in large part the water which was supplied through the conduit 35 as vapor, and by vaporization from the layer of liquid on the perforated plate 32a as well as that produced by the combustion of ammonia. This aqueous condensate is drawn off at 36c.

The cooling water employed enters the cooler 36 at a temperature between 0° and 30° C., as for example 20° C. The gas mixture may flow from the boiler 34 into the cooler 36 at atmospheric pressure and at a temperature of about 200° C. It is desirable that the temperature of the gas, when it leaves the cooler, be higher than 100° C. Usually the temperature is between 100 and 200° C. and may be about 140° C. The gas mixture which leaves the bottom of the cooler 36 after separation of the aqueous condensate has a temperature which is higher than 100° C. and a dew point or saturation temperature which is considerably below 100° C., as for example between 50° and 70° C.

This gas mixture contains less than the half of the amount of water which it would contain if it were saturated at the outlet temperature of 140° C. and if it has a dew point of about 70° C. it contains less than $\frac{1}{10}$ of the amount of water it would contain if its dew point were 140° C. A condensate poor in nitrogen oxides is obtained from highly concentrated oxygen-containing nitric oxide mixture when the just-described method is employed.

The steam produced in the boiler 34 may be added in part or in whole to the fresh gas. The process may of course also be employed in connection with ammonia combustion mixtures which have been prepared catalytically without addition of steam as for example by cooling of the catalyst.

The gas mixture leaving the cooler 36 may be passed through a pipe 37 and a cooler 38 and into a liquefier 39, in which at say about −10° C., liquid nitrogen tetroxide is produced by condensation.

In the cooler 38, there are tubes externally cooled by water which is introduced at 38a and drawn off at 38b. The gas mixtures pass through the tubes 38c.

The aqueous nitric acid is drawn off from the cooler 38 at 40 together with the condensed liquid nitrogen tetroxide from the liquefier 39.

The gas which is not liquefied in 39 flows through a tube 41 and an absorbing tower 42 and escapes at 43.

The nitrogen oxides which are still present in this gas are absorbed by highly concentrated nitric acid, which enters at the top of the tower 42 and flows down through the tower counter current to the flow of the gases. This concentrated nitric acid, after enrichment with the residual nitrogen oxides is forced through a tube 45 to a tower 46 by the pump 44.

The upper part of the tower 46 is equipped with a cooling water jacket 47 and the lower part is equipped with a steam jacket 48. Cooling water is supplied at 47a and escapes at 47b. Steam is supplied at 48a and the condensate formed escapes at 48b.

The dissolved nitrogen oxides are evolved in the lower part of the tower 46 and any nitric acid carried thereby is condensed in the upper part of the tower. These nitrogen oxides are thereupon introduced into the cooler 38 by the tube 49, which may be connected to the conduit 37.

The highly concentrated nitric acid, from which the nitrogen oxides have been removed in the tower 46, flows from the bottom of the tower into a jacketed cooler 50 and is thereupon pumped to the tower 42 through the tube 52 and the jacketed cooler 53 by the pump 51.

Cold brine, (for example having a temperature of −12° C.) enters the cooler 53 at 53a, leaves the same at 53b, enters the brine jacket of the tower 42 at 42a, leaves the same at 42b, flows into the liquefier 39 at 39a, leaves the same at 39b, (for example at a temperature of −9° C.)

The oxidation of NO to $NO_2$ takes place in the cooler 38.

The mixture of aqueous nitric acid and nitrogen tetroxide at 40 may be used to produce highly concentrated nitric acid.

What is claimed is:

1. A process of carrying out gas reactions which comprises reacting together a plurality of gases which will form a condensible constituent and a desired gaseous reaction product, preliminarily condensing a major part of said condensible constituent from the gases while maintaining said gases above the saturation temperature or dew point for said constituent and then subsequently recovering the reaction product, said condensing being effected by contacting the gases with cold surfaces which are maintained at a temperature substantially below the dew point or saturation temperature for the condensible constituent, whereby said condensible constituent will be condensed in large part upon said cold surfaces and may be removed from said cold surfaces, the cooling of said gases being so regulated as to avoid cooling said gases down to the dew point or saturation temperature for said condensible constituent.

2. A process of carrying out gas reactions which comprises reacting together a plurality of gases which will form water vapor and a desired gaseous reaction product, and preliminarily condensing a major part of the water vapor while maintaining the gases at a temperature substantially above the saturation point or dew point for the water vapor, said condensing being effected by contacting the gases with cold surfaces which are maintained at a temperature substantially below the dew point or saturation temperature for the condensible constituent, whereby said condensible constituent will be condensed in large part upon said cold surfaces and may be removed from said cold surfaces, the cooling of said gases being so regulated as to avoid cooling said gases down to the dew point or saturation temperature for said condensible constituent.

3. A process of carrying out gas reactions which comprises reacting together a plurality of gases which will form a condensible constituent and a desired gaseous reaction product, preliminarily condensing a major part of said condensible constituent from the gases while maintaining said gases above the saturation temperature or dew point for said constituent, removing the condensed constituent from further contact with the gases and then subsequently recovering the reaction product, said condensing being effected by contacting the gases with cold surfaces which are maintained at a temperature substantially below the dew point or saturation temperature for the condensible constituent, whereby said condensible constituent will be condensed in large part upon said cold surfaces and may be removed from said cold surfaces, the cooling of said gases being so regulated as to avoid cooling said gases down to the dew point or saturation temperature for said condensible constituent.

4. A process of carrying out gas reactions which comprises reacting together a plurality of gases which will form a condensible constituent and a desired gaseous reaction product, preliminarily condensing a major part of said condensible constituent while maintaining the gases at a temperature substantially above the boiling point of said constituent and then subsequently recovering the reaction product, said condensing being effected by contacting the gases with cold surfaces which are maintained at a temperature substantially below the dew point or saturation temperature for the condensible constituent, whereby said condensible constituent will be condensed in large part upon said cold surfaces and may be removed from said cold surfaces, the cooling of said gases being so regulated as to avoid cooling said gases down to the dew point or saturation temperature for said condensible constituent.

5. A process of carrying out gas reactions which comprises reacting together a plurality of gases which will form a condensible constituent and a desired gaseous reaction product, preliminarily condensing a major part of said condensible constituent by flowing said gases over cold surfaces having a temperature sufficiently low to cause condensation of said constituent, removing the condensed constituent from further contact with the gases and then subsequently recovering the reaction product, said condensing being effected by contacting the gases with cold surfaces which are maintained at a temperature substantially below the dew point or saturation temperature for the condensible constituent, whereby said condensible constituent will be condensed in large part upon said cold surfaces and may be removed from said cold surfaces, the cooling of said gases being so regulated as to avoid cooling said gases down to the dew point or saturation temperature for said condensible constituent.

6. A process of carrying out gas reactions which comprises reacting together a plurality of gases which will form water vapor and a desired gaseous reaction product, preliminarily condensing a major part of the water vapor by flowing said gases over cold surfaces having a sufficiently low temperature to condense said water vapor and at the same time maintaining said gases above saturation temperature, removing the condensed water from further contact with the gases and then subsequently recovering the reaction product, said condensing being effected by contacting the gases with cold surfaces which are maintained at a temperature substantially below the dew point or saturation temperature for the condensible constituent, whereby said condensible constituent will be condensed in large part upon said cold surfaces and may be removed from said cold surfaces, the cooling of said gases being so regulated as to avoid cooling said gases down to the dew point or saturation temperature for said condensible constituent.

7. A process of carrying out gas reactions which comprises forming a reaction mixture, adding water vapor, passing the gas mixture through a catalytic zone, treating the gases to condense a large proportion of the water vapor present without removing the desired gaseous reaction product and then recovering the desired reaction product, said condensing being effected by contacting the gases with cold surfaces which are maintained at a temperature substantially below the dew point or saturation temperature for the condensible constituent, whereby said condensible constituent will be condensed in large part upon said cold surfaces and may be removed from said cold surfaces, the cooling of said gases being so regulated as to avoid cooling said gases down to the dew point or saturation temperature for said condensible constituent.

8. A process of carrying out gas reactions which comprises reacting together a plurality of gases which will form a gas body containing a condensible constituent and a gaseous reaction product to be recovered, preliminarily condensing said condensible constituent from the gases by flowing said gases in relatively close contact with a cooling surface which has so low a temperature as to cause a relatively high partial pressure drop towards the surface resulting in a large amount of the condensible constituent being condensed upon said surface without cooling the gas body to its saturation temperature or dew point, so that the entire gas body will contain much less condensible constituent in leaving contact with the cooling surface than it would contain if it were saturated with said condensible constituent, and then subsequently recovering the reaction product.

9. The process of claim 8 in which the condensible constituent is water vapor or steam.

10. The process of claim 8 in which the condensible constituent is water vapor or steam and in which the temperature of the gases throughout contact with the cooling surface is maintained at a temperature above the boiling point of water.

11. The process of claim 8 in which the plurality of gases include ammonia and oxygen which are reacted together in the presence of a catalyst and in which process they form a gas body containing water vapor as a condensible constituent and nitric oxide which is to be further treated.

12. The process of claim 8 in which the plurality of gases includes ammonia and oxygen which are catalytically reacted together to form a gas body containing water vapor and nitric oxide, and in which the temperature of the gases when in contact with the cooling surface is maintained so high that the nitric oxide while in contact with the cooling surface substantially will not be converted into nitrogen peroxide.

13. A process of producing concentrated nitric acid from ammonia, which comprises preparing a reaction mixture containing ammonia and oxygen, adding sulphur dioxide to the mixture, passing said mixture through a catalytic zone forming a gaseous mixture of nitric oxide, water vapor and oxygen, treating the gases to condense a large proportion of the water vapor present without any substantial oxidation of the nitric oxide and without any substantial solution and absorption of the nitric oxide in the water, then oxidizing the nitric oxide to form nitrogen peroxide, and further treating said nitrogen peroxide to form concentrated nitric acid.

NIKODEM CARO.
ALBERT RUDOLF FRANK.
RUDOLF WENDLANDT.
THOMAS FISCHER.